Oct. 25, 1960   R. M. BALLARD ET AL   2,957,554
MULTIPLE PISTON ARRESTING GEAR
Filed Jan. 23, 1956   2 Sheets-Sheet 2
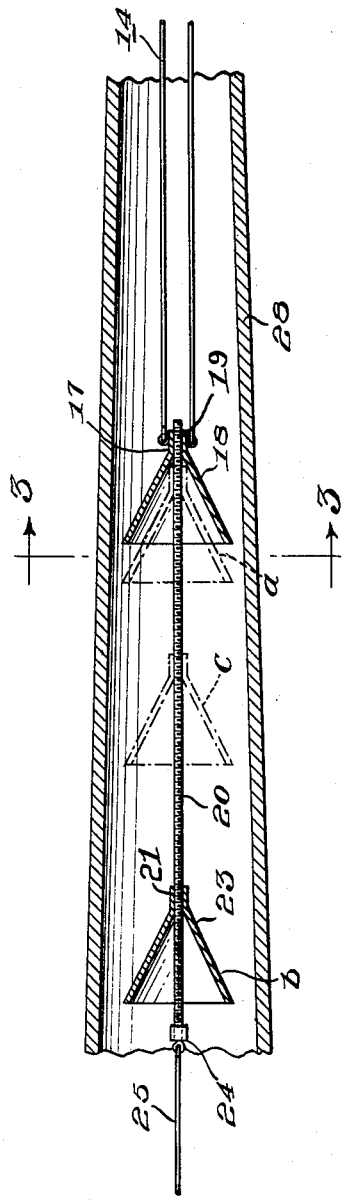
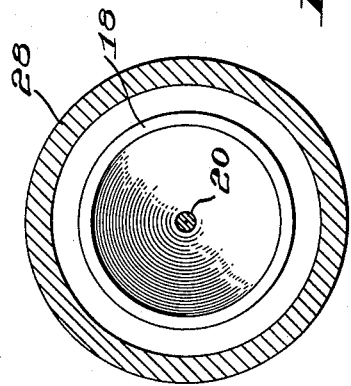
INVENTORS
Raymond M. Ballard.
Charles J. Daniels.
and Donald B. Doolittle.
BY Herbert M. Birch
ATTORNEY > # United States Patent Office

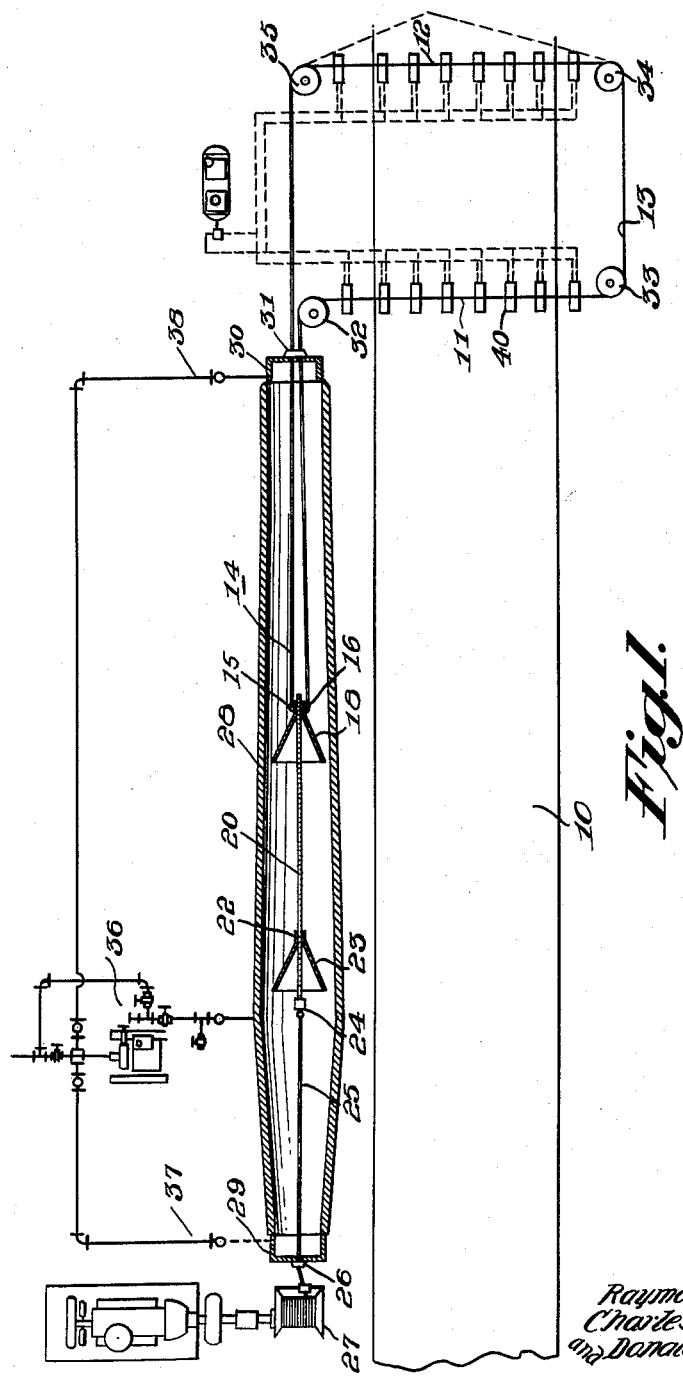

2,957,554
Patented Oct. 25, 1960

2,957,554

MULTIPLE PISTON ARRESTING GEAR

Raymond M. Ballard, Newark, and Charles J. Daniels and Donald B. Doolittle, Wilmington, Del., assignors to All American Engineering Company, Wilmington, Del., a corporation of Delaware Filed Jan. 23, 1956, Ser. No. 560,787

4 Claims. (Cl. 188—96)

The present invention relates to arresting gear for decelerating mobile objects, such as test sleds, aircraft, motor vehicles and the like, and more particularly to arresting gear comprising a tapered elongated tube filled with fluid and traversed by a cable connected arresting piston means.

Heretofore arresting gear of the liquid filled tapered tube type have been provided with a single arrester piston. These prior arresting gears are very efficient in action and it is possible to obtain a tapered tube, which, with a given piston, will give an optimum deceleration during arrestment for a given weight. However, if the weight is decreased or increased the deceleration during arrestment tends to peak at the beginning or the end of the arrest runout. These peak decelerations can be avoided if the drag characteristic of the piston can be varied.

It is an object of this invention to provide a novel piston arrangement, whereby an adjustment in piston drag may be made to avoid peak deceleration with increased or decreased weight during arrestment.

Another object is to provide in an arresting gear of the water squeezer type, a multiple piston system adjustable for optimum deceleration of various weights.

A further object is to provide in an arresting gear of the water tube and piston drag type, a multiple piston arrangement adapted to be adjusted for either single or multiple piston action.

Still a further object is to provide novel means for obtaining high pressure in a fluid filled arrest tube with high energy absorbtion without the necessity of close mechanical clearance between the piston and tube well.

With these and other objects in view, the invention consists in the construction, arrangement and combination of parts hereinafter described and particularly pointed out in the claims, it being understood that it is not intended to limit the same to the details of construction.

In the drawings like parts throughout the several views are given like numerals and are thus identified in the following detailed description wherein:

Figure 1 is a top plan schematically illustrating one arrangement of the present invention adjacent a runway or landing surface with an arresting loop in position for operation;

Figure 2 is a fragmentary section view enlarged to illustrate the dual arrest piston arrangement; and Figure 3 is a transvese section view on the section line 3—3 of Figure 2.

Referring in detail to the several figures and first with respect to Figure 1, there is illustrated a runway 10 traversed by the cross strands 11 and 12 of an arrest cable loop 13 formed from the arrest cable 14. The free ends of the loop 13 connect to coupling means 15 and 16 at the nose 17 of a cone-shaped drag piston 18. Any suitable shape and form of piston may be used.

The nose of the conical piston 18 is formed with a threaded bore 19 to receive an elongated screw threaded rod 20. This rod extends from the trailing end of the piston 18 through the threaded bore 21, nose 22 and beyond the trailing end of a second similarly shaped piston 23. On the end of the rod 20 is a coupling element 24 to which is coupled a retrieving cable 25. This retrieving cable leads out through a stuffing gland 26 to a power rotated winch 27 and serves to pull the arrest piston assembly back to the retrieve end after an arrest operation at the flared end of the arrest tube 28 in which the piston assembly is confined.

Each end of the arrest tube 28 is capped with a sump 29 and 30. For example, sump 30 is formed with a stuffing gland 31 for the arrest cable strands to feed through from the coupled connection with the piston assembly inside the tapered tube bore. As shown in Figure 1, the strands 11 and 12 of the cable 14 are crossed over the runway 10 and reeved around sheaves 32, 33, 34 and 35 into the arrest loop 13.

The means generally designated as 40 in Fig. 1 are for the purpose of elevating the arrest cable strands 11 and 12 above the runway 10 as is fully disclosed in Patent No. 2,777,653, issued January 15, 1957, and which means forms no part of the present invention.

Pump means 36 are provided to maintain the tube filled with liquid and the sumps provide for leakage return to the pump system 36 through lines 37 and 38.

In Figure 2 the arrest piston assembly is disclosed only with the two pistons 18 and 23, although as many pistons as needed may be used. These pistons are adjustable throughout the length of the connector rod 20 and as illustrated may be set, first, in a nested position $a$ to form in effect a single piston, second, extended to a wide spaced position $b$ to give an extensive spacing between the pistons 18 and 23, or third, the pistons may be separated or extended to any intermediate position $c$, as shown in the dotted piston position. Preferably the piston spacing is preset before an arrestment.

Thus, there is provided a multiple piston arrangement for liquid filled tapered arrest tubes with an arresting cable pull out loop connected thereto, which is readily adjusted for different arrest weights, so that the drag characteristic of each predetermined adjusted piston position will result in optimum deceleration for each of the respective different weights to be decelerated.

The improved piston arresting means according to the present invention is utilized in the same general system as disclosed in said patent, the present invention being an improvement on the arresting system disclosed in said patent to the extent only of the relatively adjustable tandem conical pistons 18 and 23 and their cooperation with the arrest tube 28.

While only one specific embodiment of the invention is hereinbefore set forth, it is to be expressly understood that the same is not to be limited to the details or construction and arrangement of the parts as illustrated and described because various modifications may be developed in putting the invention into practice within the scope of the appended claims.

What is claimed is:

1. An arresting gear of the liquid filled tube and arresting piston type, comprising an elongated connecting rod having free floating movement within the tube, and a plurality of hollow conical pistons mounted in said tube in spaced apart relation on said rod, said pistons being adjustable on said rod from adjacent nested position to a plurality of spaced apart positions along the said connecting rod.

2. An arresting gear comprising an elongated liquid filled tapered tube having an arrest end and a retrieve end, an elongated threaded rod floatingly supported in said tube normally axially thereof, a pair of pistons disposed in tandem on said rod and being threadedly engaged therewith for relative adjustment lengthwise of the rod, said pistons having conical outer walls with their apices directed toward the arrest end of said tube, an arrest cable connected to the piston nearest said arrest end of the tube, and a retrieve cable connected to the end of the rod nearest the retrieve end of the tube.

3. An arresting gear according to claim 2, wherein said pistons are of hollow formation and having also conical inner walls whereby the pistons are capable of adjustment along said rod with one thereof nested within the other.

4. An arresting gear of the liquid filled tube and arresting piston type, comprising an elongated connecting rod free of engagement with the tube, and a plurality of hollow conical pistons mounted in said tube in spaced apart relation on said rod, said pistons being adjustable from adjacent nested position to a plurality of spaced apart positions along the said connecting rod, said connecting rod being screw threaded and each of said pistons being formed with a cylindrical nose having a threaded bore for receiving a portion of said connecting rod, and cable coupling means on each end of said rod.

References Cited in the file of this patent

UNITED STATES PATENTS

| | | |
|---|---|---|
| 277,891 | Ellithorpe | May 22, 1883 |
| 654,341 | Bristol et al. | July 24, 1900 |
| 893,609 | Dennis | July 21, 1908 |
| 1,105,603 | Bardsley | Aug. 4, 1914 |
| 1,143,753 | De Fernanzo | June 22, 1915 |
| 1,315,320 | Le Mesurier | Sept. 9, 1919 |
| 1,351,558 | Durbin | Aug. 31, 1920 |
| 1,451,148 | Floring | Apr. 10, 1923 |
| 1,799,872 | Seipel | Apr. 7, 1931 |
| 2,777,653 | Cotton et al. | Jan. 15, 1957 |